(No Model.)
W. T. CLARK.
MARKING TAG.
No. 361,987. Patented Apr. 26, 1887.
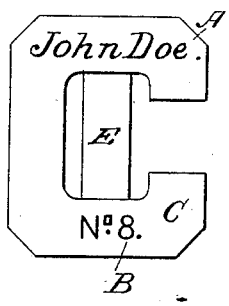
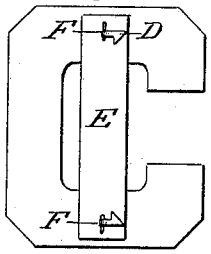
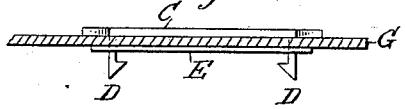
Witnesses.
J. R. Stuart
L. Seward Bacon
Inventor:
William T. Clark.
By C. M. Marble
Atty.

UNITED STATES PATENT OFFICE.

WILLIAM T. CLARK, OF BURLINGAME, KANSAS.

MARKING-TAG.

SPECIFICATION forming part of Letters Patent No. 361,987, dated April 26, 1887.

Application filed January 24, 1887. Serial No. 225,356. (No model.)

*To all whom it may concern:*

Be it known that I, WILLIAM T. CLARK, a citizen of the United States, residing at Burlingame, in the county of Osage and State of Kansas, have invented certain new and useful Improvements in Marking-Tags; and I do hereby declare the following to be a full, clear, and exact description of the invention, such as will enable others skilled in the art to which it appertains to make and use the same.

My invention relates to tags, particularly to that class of tags used for the purpose of marking or designating cattle or other live stock; and it consists in the peculiar construction and arrangement of the parts of the same, as will be fully hereinafter described, and pointed out in the claim.

The object of my invention is to provide a device to be used in marking and numbering cattle, &c., which will be distinctive, simple in its construction, easily handled or applied, and cheaply manufactured. I attain this object by the device illustrated in the accompanying drawings, wherein the same letters of reference indicate same parts, and in which—

Figure 1 is a front plan view of my tag in the form of an initial letter with the name of the owner and the number of the animal indicated thereon. Fig. 2 is a rear plan view of the tag, showing the rear plate in position and means for fastening the same to the initial letter. Fig. 3 is a side view of my marking-tag, showing a section of an animal's ear placed between the initial letter and plate, and with the brads or fastening devices projecting therethrough.

This tag is mainly intended for marking or numbering cattle or other live stock, but may also be used for other purposes.

The letter C, or any other letter corresponding to the initial of the name of the person intending to use the same, is cut or stamped out of a plate of any suitable material, preferably what is known as "white-metal", which precludes the possibility of corrosion and prevents the ear of the animal to which it is attached from becoming sore. The full name, A, of the person, "John Doe," for instance, and the registered number, B, of the animal to which the tag is to be attached, are then countersunk in, raised on, or otherwise suitably applied to the initial letter C, thus showing at a glance the ownership of said animal and its officially-registered number.

On the rear or reverse side of the initial letter C are sharp-pointed outwardly-extending metallic fastenings D, either attached thereto or formed integrally with the plate constituting said initial letter, which are to be bent down into outwardly-extending position. They may be of any suitable shape, but are preferably bearded, as shown in Fig. 3, which prevents the initial letter or tag from being detached from the ear. A metallic plate, E, also preferably made of white-metal, is constructed with slots F F in its ends to admit of the passage of the metallic fastenings D, said plate E to be made of suitable length and width to conform to the size of the letter in conjunction with which it is to be fastened to the animal's ear.

The tag is to be attached to the ear of the animal in the following manner: The ear G is held in such manner that its outside portion will present a smooth and even surface. The tag or letter C is then placed upon this outside surface, the points of the brads or fastenings D resting on the ear. By placing the thumbs of both hands on the top of the tag or letter and immediately over the downwardly-extending brads or fastenings D and the fingers beneath on the inner side of the ear, a firm but gentle pressure will cause the brads D to pierce and pass through the cartilaginous substance and protrude outwardly from the inner portion of the ear. The plate E is then placed on the inner side of the ear directly opposite the letter C, the sharp-pointed brads or fasteners D passing through the slots F F of the plate E. The brads D are then turned down and firmly pressed upon the plate E, thus preventing the letter or tag from becoming loosened or detached from the ear.

Should the cartilaginous substance of the ear be so tough that the pressure of the fingers and thumbs will be insufficient to cause the brads D to pass through it, a pair of pliers may be used for the purpose, and also to clinch or turn down the brads D after they have passed through the ear and plate, if they should be too stiff to be turned down with the fingers.

Having thus described my invention and the mode of operating the same, what I claim as new, and desire to secure by Letters Patent, is—

A marking-tag of metal or other suitable material, consisting of a plate formed into an initial letter and having the name of the owner and registered number of the animal formed thereon, and provided with beard-shaped fastenings for securing the same to the animal, and the plate E, also made of metal or other suitable material and having slots F F in its ends, substantially as and for the purpose described.

In testimony whereof I affix my signature in presence of two witnesses.

WILLIAM T. CLARK.

Witnesses:
A. M. MINER,
A. G. SHARP.